US012563273B1

(12) United States Patent
Shanson et al.

(10) Patent No.: US 12,563,273 B1
(45) Date of Patent: Feb. 24, 2026

(54) METHODS AND SYSTEMS FOR MANAGING STREAMING VIDEO SUB-CLIPS FOR FRAME ACCURATE SERVER SIDE CONTENT INSERTION

(71) Applicant: Pluto Inc., West Hollywood, CA (US)

(72) Inventors: Spencer Adam Shanson, Menlo Park, CA (US); Vadym Kupriianchuk Igorovich, Warsaw (PL); Pavlo Kalmykov Vasilievich, West Hollywood, CA (US); Khodos Oleksandr Yevheniiovych, Kyiv (UA)

(73) Assignee: Pluto Inc., West Hollywood, CA (US)

( * ) Notice: Subject to any disclaimer, the term of this patent is extended or adjusted under 35 U.S.C. 154(b) by 0 days.

(21) Appl. No.: 18/931,468

(22) Filed: Oct. 30, 2024

(51) Int. Cl.
  *H04N 21/845* (2011.01)
  *H04N 21/858* (2011.01)

(52) U.S. Cl.
  CPC ....... *H04N 21/845* (2013.01); *H04N 21/8583* (2013.01)

(58) Field of Classification Search
  CPC .......................... H04N 21/845; H04N 21/8583
  See application file for complete search history.

(56) References Cited

U.S. PATENT DOCUMENTS

| | | | |
|---|---|---|---|
| 5,411,493 A | 5/1995 | Rodriguez |
| 6,378,129 B1 | 4/2002 | Zetts |
| 6,423,047 B1 | 7/2002 | Webster |
| 6,625,811 B1 | 9/2003 | Kaneko |
| 6,982,780 B2 | 1/2006 | Morley |
| 7,028,327 B1 | 4/2006 | Dougherty |
| 7,694,318 B2 | 4/2010 | Konig |
| 8,005,826 B1 | 8/2011 | Sahami |
| 8,418,195 B1 | 4/2013 | Page |

(Continued)

FOREIGN PATENT DOCUMENTS

| | | |
|---|---|---|
| CN | 101 193 282 A | 6/2008 |
| EP | 0 594 350 A1 | 4/1994 |

(Continued)

OTHER PUBLICATIONS

Host. Oxford Dictionaries. Oxford University Press, n.d. Web. Sep. 3, 2016. <http://www.oxforddictionaries.com/us/definition/american_english/host>., 7 pages.

(Continued)

*Primary Examiner* — Kyu Chae
(74) *Attorney, Agent, or Firm* — Knobbe, Martens, Olson & Bear LLP

(57) ABSTRACT

Systems and methods are disclosed to efficiently insert new breakpoints into video content. A splicing window for a first breakpoint is applied to a portion of an item of video content, wherein the portion of the item of video content has been transcoded. New subclips are generated for the portion. The portion is re-transcoded, wherein a boundary between a first subclip and a second subclip defines a location for a first breakpoint. Existing segments that can be used are identified; the existing segments associated with corresponding existing playlists. New playlists for the new subclips are generated. The new playlists and the existing playlists are transmitted to a client. Corresponding content is streamed to the client in response to client requests.

21 Claims, 10 Drawing Sheets

(56)                    References Cited

U.S. PATENT DOCUMENTS

| | | |
|---|---|---|
| 8,483,393 B2 | 7/2013 | Robert |
| 8,533,761 B1 | 9/2013 | Sahami |
| 8,572,649 B1 | 10/2013 | Gossweiler, III |
| 8,578,042 B2 | 11/2013 | Hu |
| 8,584,169 B1 | 11/2013 | Roberts |
| 8,631,440 B2 | 1/2014 | Gossweiler, III |
| 8,745,023 B2 | 6/2014 | Libin |
| 8,826,443 B1 | 9/2014 | Raman |
| 8,886,745 B2 | 11/2014 | Kannan |
| 9,077,667 B2 | 7/2015 | Sridhar |
| 9,112,623 B2 | 8/2015 | Blaxland |
| 9,130,918 B2 | 9/2015 | Picconi |
| 9,258,589 B2 | 2/2016 | Grouf et al. |
| 9,301,020 B2 | 3/2016 | Sun |
| 9,584,874 B1 | 2/2017 | Farfas |
| 9,699,515 B2 | 7/2017 | Grouf et al. |
| 9,712,884 B2 | 7/2017 | Grouf et al. |
| 9,998,787 B2 | 6/2018 | Grouf et al. |
| 10,104,445 B2 | 10/2018 | Patel |
| 10,200,434 B1 | 2/2019 | Wells |
| 10,231,018 B2 | 3/2019 | Grouf et al. |
| 10,327,037 B2 | 6/2019 | Shanson et al. |
| 10,356,447 B2 | 7/2019 | Shanson |
| 10,356,480 B2 | 7/2019 | Hou et al. |
| 10,560,746 B2 | 2/2020 | Grouf et al. |
| 10,681,395 B1 | 6/2020 | Gang et al. |
| 10,681,431 B2 | 6/2020 | Levy |
| 10,715,848 B2 | 7/2020 | Hou |
| 10,820,066 B2 | 10/2020 | Caulfield |
| 10,902,474 B2 | 1/2021 | Lo |
| 10,931,990 B2 | 2/2021 | Hou |
| 10,939,168 B2 | 3/2021 | Grouf et al. |
| 11,178,433 B2 | 11/2021 | Hou |
| 11,463,741 B2 | 10/2022 | Hou |
| 11,533,527 B2 | 12/2022 | Shanson |
| 2002/0038457 A1 | 3/2002 | Numata |
| 2002/0061067 A1 | 5/2002 | Lyons |
| 2002/0083439 A1 | 6/2002 | Eldering |
| 2002/0083442 A1 | 6/2002 | Eldering |
| 2002/0121273 A1 | 9/2002 | Nyilas |
| 2003/0058707 A1 | 3/2003 | Dilger |
| 2003/0074664 A1 | 4/2003 | Kwoh |
| 2003/0088872 A1 | 5/2003 | Maissel et al. |
| 2003/0149988 A1 | 8/2003 | Ellis et al. |
| 2003/0212708 A1 | 11/2003 | Potrebic et al. |
| 2003/0229900 A1 | 12/2003 | Reisman |
| 2004/0088737 A1 | 5/2004 | Donlan |
| 2004/0117831 A1 | 6/2004 | Ellis et al. |
| 2004/0123317 A1 | 6/2004 | Ozawa |
| 2004/0255336 A1 | 12/2004 | Logan et al. |
| 2005/0256873 A1 | 11/2005 | Walker |
| 2006/0271959 A1 | 11/2006 | Jacoby |
| 2006/0287915 A1 | 12/2006 | Boulet |
| 2006/0294548 A1 | 12/2006 | Potrebic et al. |
| 2007/0107010 A1 | 5/2007 | Jolna |
| 2007/0174125 A1 | 7/2007 | Poole |
| 2007/0204297 A1 | 8/2007 | Gonzalez |
| 2007/0204310 A1 | 8/2007 | Hua et al. |
| 2007/0294710 A1 | 12/2007 | Meesseman |
| 2007/0294734 A1 | 12/2007 | Arsenault |
| 2007/0299877 A1 | 12/2007 | Cohen et al. |
| 2008/0040743 A1 | 2/2008 | Dharmaji |
| 2008/0114880 A1 | 5/2008 | Jogand-Coulomb |
| 2008/0127257 A1 | 5/2008 | Kvache |
| 2008/0194276 A1 | 8/2008 | Lin |
| 2008/0235733 A1 | 9/2008 | Heie |
| 2008/0250445 A1 | 10/2008 | Zigmond |
| 2008/0270462 A1 | 10/2008 | Thomsen |
| 2008/0271080 A1 | 10/2008 | Gossweiler |
| 2008/0306818 A1 | 12/2008 | Evans |
| 2009/0006375 A1 | 1/2009 | Lax |
| 2009/0070819 A1 | 3/2009 | Gajda |
| 2009/0133054 A1 | 5/2009 | Boggie |
| 2009/0133090 A1 | 5/2009 | Busse |
| 2009/0172725 A1 | 7/2009 | Heilbron |

| | | | |
|---|---|---|---|
| 2009/0199114 A1 | 8/2009 | Lewis | |
| 2009/0204487 A1 | 8/2009 | Cansler | |
| 2009/0217316 A1 | 8/2009 | Gupta | |
| 2009/0235308 A1 | 9/2009 | Ehlers et al. | |
| 2009/0241145 A1 | 9/2009 | Sharma | |
| 2009/0259711 A1 | 10/2009 | Drieu et al. | |
| 2009/0300675 A1 | 12/2009 | Shkedi | |
| 2009/0327346 A1 | 12/2009 | Teinila | |
| 2010/0021512 A1 | 1/2010 | Arron | |
| 2010/0138297 A1 | 6/2010 | Fitzgerald | |
| 2010/0138298 A1 | 6/2010 | Fitzgerald | |
| 2010/0169459 A1 | 7/2010 | Biderman | |
| 2010/0272419 A1 | 10/2010 | Wang | |
| 2010/0299264 A1 | 11/2010 | Berger | |
| 2010/0325657 A1 | 12/2010 | Sellers | |
| 2011/0030012 A1 | 2/2011 | Diaz | |
| 2011/0072105 A1 | 3/2011 | Biderman | |
| 2011/0126251 A1 | 5/2011 | LaFreniere | |
| 2011/0126258 A1 | 5/2011 | Emerson | |
| 2011/0149992 A1 | 6/2011 | Sharma et al. | |
| 2011/0153423 A1 | 6/2011 | Elvekrog | |
| 2011/0179356 A1 | 7/2011 | Bassali | |
| 2011/0225315 A1 | 9/2011 | Wexler et al. | |
| 2011/0261171 A1 | 10/2011 | Otsuka et al. | |
| 2011/0264522 A1 | 10/2011 | Chan | |
| 2012/0102524 A1 | 4/2012 | Goldschmidt et al. | |
| 2012/0110621 A1 | 5/2012 | Gossweiler, III | |
| 2012/0116869 A1 | 5/2012 | Vasudevan | |
| 2012/0137015 A1* | 5/2012 | Sun | G11B 27/10 |
| | | | 709/231 |
| 2012/0144416 A1 | 6/2012 | Wetzer et al. | |
| 2012/0147952 A1 | 6/2012 | Cote et al. | |
| 2012/0174157 A1 | 7/2012 | Stinson, III | |
| 2012/0192232 A1 | 7/2012 | Ellis | |
| 2012/0272264 A1 | 10/2012 | Suzuki | |
| 2013/0148741 A1 | 6/2013 | Steinberg et al. | |
| 2013/0170818 A1 | 7/2013 | Klappert | |
| 2013/0173742 A1 | 7/2013 | Thomas et al. | |
| 2013/0175333 A1 | 7/2013 | Gilbert | |
| 2013/0198642 A1 | 8/2013 | Carney | |
| 2013/0198779 A1 | 8/2013 | Moon | |
| 2013/0239136 A1 | 9/2013 | Babu | |
| 2013/0276032 A1 | 10/2013 | Walter et al. | |
| 2013/0305285 A1 | 11/2013 | Cook | |
| 2013/0305287 A1 | 11/2013 | Wong | |
| 2013/0312028 A1 | 11/2013 | Dharmaji et al. | |
| 2013/0312041 A1 | 11/2013 | Gresta | |
| 2013/0332959 A1 | 12/2013 | Kothari | |
| 2013/0347018 A1 | 12/2013 | Limp | |
| 2014/0007170 A1 | 1/2014 | Klappert | |
| 2014/0115625 A1 | 4/2014 | McCoy | |
| 2014/0157312 A1 | 6/2014 | Williams | |
| 2014/0189743 A1 | 7/2014 | Kennedy | |
| 2014/0201791 A1 | 7/2014 | Angiolillo et al. | |
| 2014/0245351 A1 | 8/2014 | Ford | |
| 2014/0282667 A1 | 9/2014 | Major | |
| 2014/0282677 A1 | 9/2014 | Mantel | |
| 2014/0282736 A1 | 9/2014 | Elstermann | |
| 2014/0304756 A1 | 10/2014 | Fletcher | |
| 2014/0351843 A1 | 11/2014 | Theriault | |
| 2014/0366068 A1 | 12/2014 | Burkitt | |
| 2014/0373041 A1 | 12/2014 | Yan | |
| 2015/0078729 A1 | 3/2015 | Sipe | |
| 2015/0113547 A1 | 4/2015 | Wolf | |
| 2015/0128163 A1 | 5/2015 | Cormican | |
| 2015/0143413 A1 | 5/2015 | Hall | |
| 2015/0189347 A1 | 7/2015 | Oztaskent | |
| 2015/0237389 A1 | 8/2015 | Grouf et al. | |
| 2015/0245074 A1 | 8/2015 | Gordon et al. | |
| 2015/0264450 A1 | 9/2015 | Jung | |
| 2015/0302463 A1 | 10/2015 | Tinsman | |
| 2015/0310498 A1 | 10/2015 | Brandstetter | |
| 2015/0358661 A1 | 12/2015 | Garcia Navarro | |
| 2016/0112740 A1 | 4/2016 | Francisco | |
| 2016/0182951 A1 | 6/2016 | Thomas et al. | |
| 2016/0323351 A1 | 11/2016 | Luthra et al. | |
| 2017/0085962 A1 | 3/2017 | Maughan | |
| 2018/0060759 A1 | 3/2018 | Chu | |
| 2018/0069950 A1 | 3/2018 | Eswaran | |

(56) References Cited

U.S. PATENT DOCUMENTS

| | | | |
|---|---|---|---|
| 2018/0276256 A1 | 9/2018 | Sarkar | |
| 2019/0090005 A1 | 3/2019 | Kipp et al. | |
| 2019/0114662 A1 | 4/2019 | Bennion | |
| 2019/0228439 A1 | 7/2019 | Anthony | |
| 2020/0077127 A1* | 3/2020 | Morrow | H04N 21/8456 |
| 2020/0084486 A1 | 3/2020 | Cho | |
| 2020/0145702 A1 | 5/2020 | Feldman | |
| 2020/0228870 A1 | 7/2020 | Gordon | |
| 2020/0304851 A1 | 9/2020 | Hou | |
| 2020/0374602 A1 | 11/2020 | Riedel | |
| 2021/0044869 A1 | 2/2021 | Grouf et al. | |
| 2021/0168452 A1 | 6/2021 | Grouf et al. | |
| 2021/0195290 A1 | 6/2021 | Mayhew | |
| 2021/0204010 A1 | 7/2021 | Hou | |
| 2021/0362030 A1 | 11/2021 | Putnam | |
| 2022/0046302 A1 | 2/2022 | Spencer et al. | |
| 2023/0370699 A1* | 11/2023 | Pressnell | H04N 21/8586 |
| 2024/0015369 A1* | 1/2024 | Labrozzi | H04N 21/812 |

FOREIGN PATENT DOCUMENTS

| | | |
|---|---|---|
| GB | 2 343 051 A | 4/2000 |
| KR | 10-2009-0004398 A | 1/2009 |
| KR | 10-2014-0024359 A | 2/2014 |
| KR | 10-2016-0021132 A | 2/2016 |
| WO | WO 00/40021 A1 | 7/2000 |
| WO | WO 2004/028153 A1 | 4/2004 |
| WO | WO 2004/077808 A2 | 9/2004 |
| WO | WO 2005/048589 A2 | 5/2005 |
| WO | WO 2007/021725 A2 | 2/2007 |
| WO | WO 2007/123613 A1 | 11/2007 |
| WO | WO 2008/007274 A2 | 1/2008 |
| WO | WO 2011/106601 A2 | 9/2011 |
| WO | WO 2012/079054 | 6/2012 |
| WO | WO 2015/036518 A1 | 3/2015 |
| WO | WO 2015/123572 A1 | 8/2015 |
| WO | WO 2018/009408 A2 | 1/2018 |
| WO | WO 2019/060554 A3 | 3/2019 |
| WO | WO 2019/217468 A1 | 11/2019 |
| WO | WO 2020/194092 A1 | 10/2020 |

OTHER PUBLICATIONS

Li et al., "Video Multicast over the Internet", IEEE Network, vol. 13, Issue: 2, pp. 46-60, Mar./Apr. 1999.

* cited by examiner

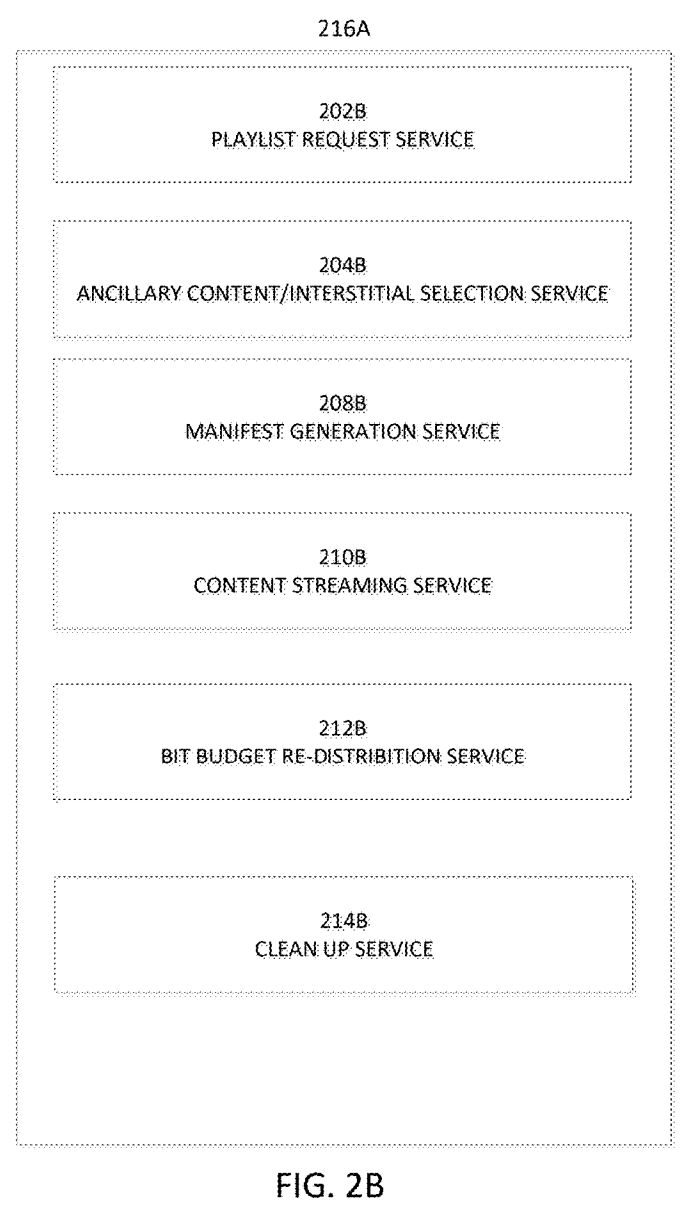

216A

202B
PLAYLIST REQUEST SERVICE

204B
ANCILLARY CONTENT/INTERSTITIAL SELECTION SERVICE

208B
MANIFEST GENERATION SERVICE

210B
CONTENT STREAMING SERVICE

212B
BIT BUDGET RE-DISTRIBUTION SERVICE

214B
CLEAN UP SERVICE

FIG. 2B

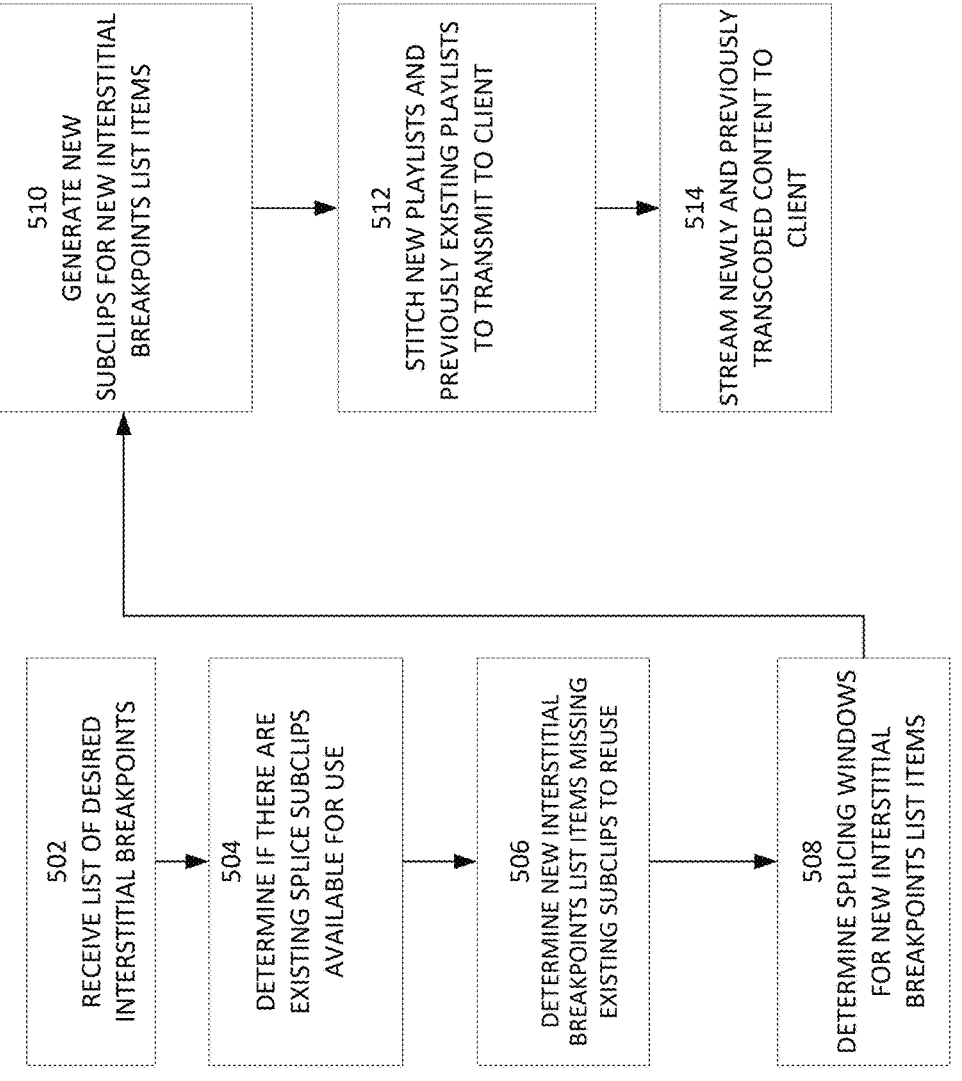

510
GENERATE NEW
SUBCLIPS FOR NEW INTERSTITIAL
BREAKPOINTS LIST ITEMS

512
STITCH NEW PLAYLISTS AND
PREVIOUSLY EXISTING PLAYLISTS
TO TRANSMIT TO CLIENT

514
STREAM NEWLY AND PREVIOUSLY
TRANSCODED CONTENT TO
CLIENT

502
RECEIVE LIST OF DESIRED
INTERSTITIAL BREAKPOINTS

504
DETERMINE IF THERE ARE
EXISTING SPLICE SUBCLIPS
AVAILABLE FOR USE

506
DETERMINE NEW INTERSTITIAL
BREAKPOINTS LIST ITEMS MISSING
EXISTING SUBCLIPS TO REUSE

508
DETERMINE SPLICING WINDOWS
FOR NEW INTERSTITIAL
BREAKPOINTS LIST ITEMS

FIG. 5

METHODS AND SYSTEMS FOR MANAGING STREAMING VIDEO SUB-CLIPS FOR FRAME ACCURATE SERVER SIDE CONTENT INSERTION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field

The present disclosure is related to video content streaming.

Description of the Related Art

Streaming media has become an important mechanism for delivering video content to users. However, when interstitial content is to be inserted within an item of primary content, such interstitial content needs to be inserted between primary content segments, rather than at a desired frame position.

One attempt to enable interstitial content to be inserted at a desired frame position, rather than between primary content segments, requires the creation of a new transcoding of the entire item of primary content with multiple sequential playlists (rather than a single full movie playlist) but split in exact places for the interstitial insertion break points. Thus, each time a new insertion point is added, the entire item of content needs to be re-transcoded.

Disadvantageously, where the content item is a movie, a full movie may, by way of illustrative example, utilize 10 Gb of memory space.

Further, disadvantageously, with the foregoing conventional approach, an entire set of new media for each sub-clipping process is created and stored in memory as an additional set. This process may need to be repeated to create a new set of subclips each time the interstitial insertion breakpoints changes, disadvantageously requiring inordinate amounts of computer processing power and memory.

In addition, disadvantageously, the fully set of new media segments will not be immediately cached on a content distribution network (CDN), slowing client access to such new media segments.

The challenge is even greater when multi-regional support is needed, wherein there may be different interstitial insertion rules for different regions. Thus, multiple transcoding of a given movie may need to be performed for each movie for each region.

Further, a poorly placed interstitial insertion breakpoint may create spikes in the bitrate and thus degrade the playout experience.

BRIEF DESCRIPTION OF THE DRAWINGS

FIG. 2B illustrates example modules and services of the content streaming system.

FIG. 5 illustrates an example process of efficiently inserting breakpoints into a video content item.

Figure 1:
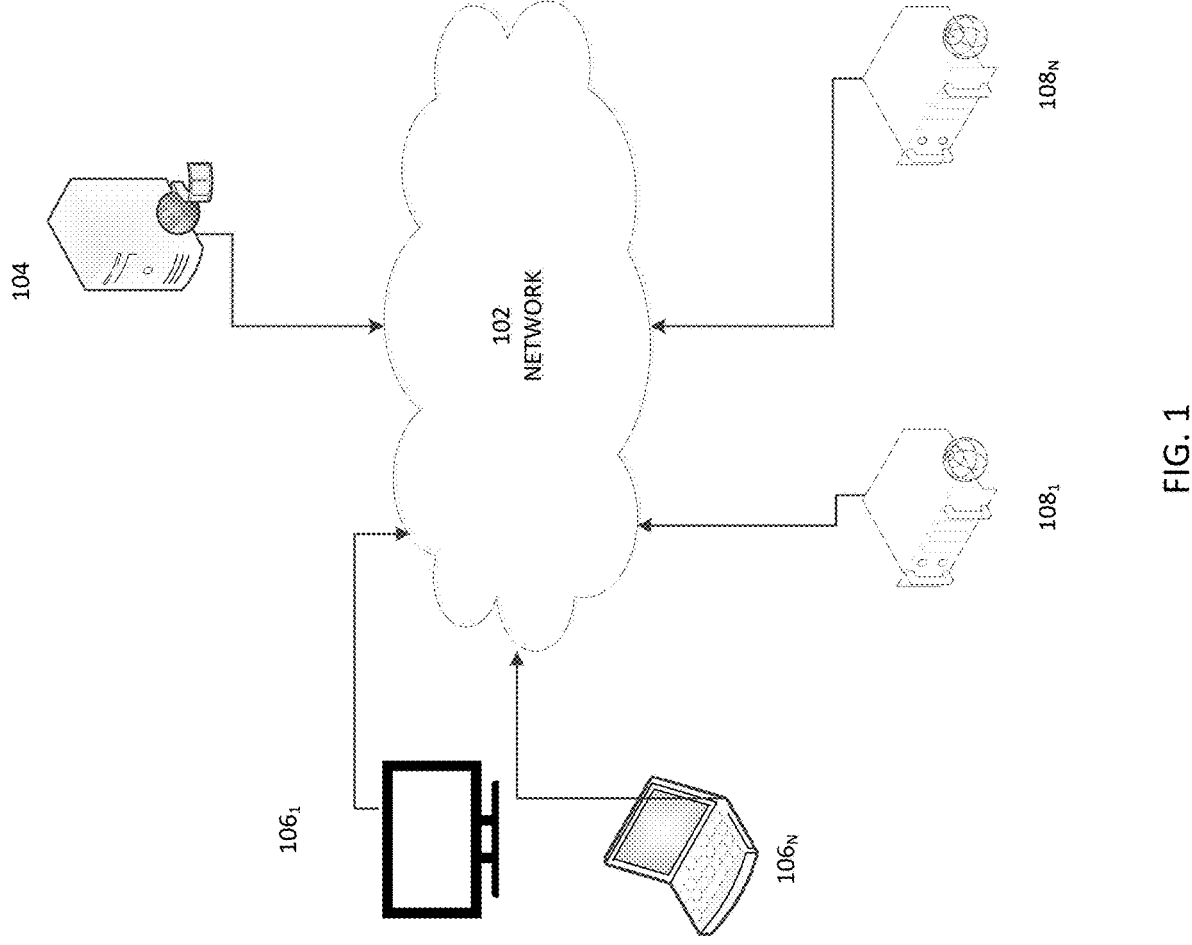
FIG. 1 illustrates an example networked environment.

While each of the drawing figures illustrates a particular aspect for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

The present disclosure describes systems and processes that overcome the above described technical problems as well as the drawbacks of conventional approaches to injecting interstitials into video content streamed to user devices. It is understood that the various aspects disclosed herein may be utilized together (e.g., via common system(s)) or separately.

By way of background, a video that is to be streamed is divided into small segments (e.g., 2-10 seconds long) encoded at different bitrates and resolutions. A video playlist in the form of manifest file (e.g., .m3u8 for HLS, .mpd for DASH) lists the available streams and their respective bitrates, resolutions, and segment URLs.

For example, an M3U8 file is a plain text file that lists the sequence of .ts segments in association with their metadata, such as segment duration. An M3U8 Playlist may include the following elements:

EXTM3U: The first line in the M3U8 file, which indicates that the file is an Extended M3U playlist.

EXT-X-VERSION: Indicates the version of the playlist format.

EXT-X-TARGETDURATION: Specifies the maximum duration (in seconds) of any single segment in the playlist.

EXTINF: Indicates the duration of respective segments. This tag is followed by the duration in seconds and a reference to the corresponding .ts file.

EXT-X-ENDLIST: Marks the end of the playlist.

When a video player on a user device starts streaming, it downloads the M3U8 playlist file. The player reads the playlist and sequentially requests each .ts segment listed in the file. If the playlist is part of an adaptive bitrate streaming setup, the player can switch between different playlists (each corresponding to a different quality level) depending on network conditions, each referencing its own set of .ts segments.

For example, the video player may begin playback by choosing an appropriate stream based on the initial network conditions. During playback, the player may continuously monitor the network conditions. If the player detects a change in network conditions (e.g., bandwidth drops or improves), it switches to a lower or higher bitrate stream accordingly. This switch typically happens at segment boundaries to minimize disruptions.

A given segment is typically assigned a sequential number. For example, in HTTP Live Streaming (HLS), the segments are numbered sequentially (e.g., segment0.ts, segment1.ts, etc., where ts is a container/file format for transmitting audio, video, and data). Certain protocols may use timestamps to identify segments. For example, MPEG-DASH (Dynamic Adaptive Streaming over HTTP) uses media presentation timestamps (MPT) for segment identification. In addition, the URLs used to fetch the segments may contain identifiers that indicate the segment number or timestamp.

Further, a given frame within a video segment may be identified by its frame number, starting from 0 for the first frame in a segment. Frames may also be identified by their presentation timestamps (PTS). The PTS indicates the exact time at which the frame should be displayed during playback.

By way of further background, interstitials, such as advertisements, may be inserted into a video stream using a stitcher. A "stitcher" in the context of online advertising refers to a technology or software component responsible for inserting ads, typically in the form of video or audio ad content, into digital media streams (although the stitcher may be used to insert other kinds of content). This process may involve dynamically integrating advertisements into the content stream at specified ad breaks or ad-pods. For example, the stitcher may prepare the primary content, comprising a video and/or audio stream such as a podcast, live stream, or on-demand video. Advertisers may provide ad inventory, which may include the ad creatives, metadata, and targeting information. Advertisers may also specify ad formats (e.g., pre-roll, mid-roll, post-roll) and ad durations.

When it is time to insert an ad, the stitcher service takes the ad creative from the ad server and seamlessly integrates it into the content stream. This integration may involve replacing part of the main content or temporarily pausing it, depending on the ad format and platform.

The final content, now with ads stitched in, may be delivered to the user's device for playback. The user experiences a continuous stream with ads seamlessly integrated at the specified ad breaks. The stitcher service may also enforce policies related to ad insertion, such as ad volume limits and ad load restrictions.

Stitchers may be used in the context of Dynamic Ad Insertion (DAI), where ads are inserted in real-time based on user data and behavior. This allows for highly personalized ad experiences.

As similarly discussed elsewhere herein, streaming media has become an important mechanism for delivering video content to users. However, as discussed above, when interstitial content is to be inserted within an item of primary content comprising multiple segments, such interstitial content is restricted to insertion points between primary content segments, rather than at a desired frame position. Given the number of frames in a ts segment, this can result in an unsatisfactory placement, where the content adjacent to the interstitial content item may be unsuitable with respect to the interstitial content. For example, if the interstitial content is an advertisement for a vehicle, it may not be suitable to place the interstitial content immediately adjacent to a frame of a car explosion.

Further, without frame-accurate insertion, the playback can be jarring to a viewer who may view the first few frames of the next scene before the video playback cuts to the interstitial. Similarly, the audio track for the first few frames of the next scene may be played and the cut off by the interstitial audio track, and the playback of the audio track for the next frames of the next scene will only resume after the interstitial. The opposite scenario may also occur. The interstitial may disadvantageously be inserted before the end of the current scene, and the last few scene frames are displayed after the interstitial is played back. Similarly, the audio track for the last few frames of scene may be cut off by the interstitial audio track, where the audio track for the last few frames of scene to be played after the interstitial.

The number of frames in a segment may be calculated as follows:

$$\text{Total Frames} = \text{Frame Rate} \times \text{Segment Duration}$$

Thus, for a frame rate per seconds (fps) of 30 fps, and a segment duration of 5 second, there may be 150 frames in a segment.

If the frame rate is 60 fps and the duration is 5 seconds, there may be 300 frames in a segment.

It would be very desirable to insert interstitial content with greater resolution than 100 or more frames. It would be very desirable to insert an interstitial adjacent to a specific frame and/or at a specific time point.

As similarly discussed elsewhere herein, one attempt to enable interstitial content to be inserted at a desired frame position, rather than between primary content segments, requires that creation of a new transcoding of the entire content item, such as a movie, with multiple sequential playlists (rather than a single full movie playlist) split in exact places for the interstitial insertion breakpoints. However, as similarly discussed above, with the foregoing approach, the whole set of new media for each subclipping process is created and stored in memory as an additional set. By way of background, a subclip refers to a smaller, defined portion of a larger video clip. Thus, each time a new insertion point is added, the entire item of content needs to be re-transcoded. A subclip may include multiple segments. Subclips are typically used for editing and extracting parts of videos.

In the context of video streaming, a subclip array comprises a structured collection of smaller video segments (subclips) that together form part of a larger video stream. A subclip array may be utilized to reference or manage multiple subclips as a group, enabling efficient handling and manipulation within the streaming process. In playlist or manifest files (e.g., M3U8 for HLS), the subclip array may represent a sequence of URIs (Uniform Resource Identifiers) pointing to specific subclips. This enables the video player that receives the playlist/manifest file to fetch and play these subclips in sequence or as needed.

Fragments are smaller portions of a clip. A clip.fragments array is a structured collection (or list) that holds the references to the fragments that make up a particular clip.

Each entry in the clip.fragments array typically points to a specific fragment of the clip, including metadata such as the fragment's start time, duration, URL, or byte.

!!!! Certain aspects will now be discussed with reference to the figures.

FIG. 1 illustrates an example environment. A content streaming system 104 (which may include a stitcher component, optionally hosted on a server, providing stitcher services, optionally comprising bit redistribution services and interstitial breakpoint insertion services) is connected to a network 102. The content streaming system 104 is configured to communicate with client devices 1061 . . . 106n (e.g., associated with users of a streaming service) that comprise video players (e.g., smart phones, networked televisions, tablet computers, desktop computers, laptop computers, networked game consoles, automotive entertainment devices, and/or the like). By way of example, the video player may be embedded in a webpage, may be a dedicated video player application, may be part of a larger app (e.g., a game application, a word processing application, etc.), and/or the like. The video player may be configured to play video and/or audio content, including primary content and ancillary content. For example, the content streaming system 104 may receive a request for media from a given client device 106 in the form of a request for a playlist manifest or updates to a playlist manifest.

The content streaming system 104 may identify, from a file, the location (which may correspond to an interstitial breakpoint location) and length of an ancillary content pod, such as an interstitial pod (a time frame reserved for ancillary content, such as interstitials, wherein one or more interstitials may be needed to fill a pod, wherein an item of ancillary content may be in the form of interstitial content), determine context information (e.g., information regarding the primary content being requested, information regarding the user, and/or other context information), solicit and select interstitial content from third parties, define customized interstitials, insert interstitial breakpoints, generate playlist manifests, and/or perform other functions described herein. The content streaming system 104 and/or another system may stream requested content to the requesting device 106.

Optionally, the content streaming system 104 may transmit context information to one or more interstitial source systems 1081 . . . 108n. For example, the source systems 1081 . . . 108n may optionally include ad servers, and the interstitial content may comprise ads. The interstitial source systems 1081 . . . 108n may comply with the VAST protocol. By way of further example, the interstitial source systems 1081 . . . 108n may provide public service videos, previews of upcoming programs, quizzes, news, games, and/or other content. The interstitial source systems 1081 . . . 108n may use the context information in determining what interstitial content is to be provided or offered to the requesting client device 106. Optionally, as part of a decisioning process, the interstitial source systems 1081 . . . 108n may submit bids to place interstitial content in association with primary content, and the content streaming system 104 may evaluate the bids and optionally based at least in part on the bids, select one or more items to insert into an interstitial pod. The content streaming system 104 may be configured to transmit closed caption messages (e.g., SEI messages) for respective video frames.

The content streaming system 104 may be configured to execute processes discussed herein in whole or in part. As similarly described elsewhere herein, the content streaming system 104 may be configured to enable the transcoding of video content and the redistribution of bit budgets to accommodate new interstitial breakpoints utilizing a splicer window.

Figure 2A:
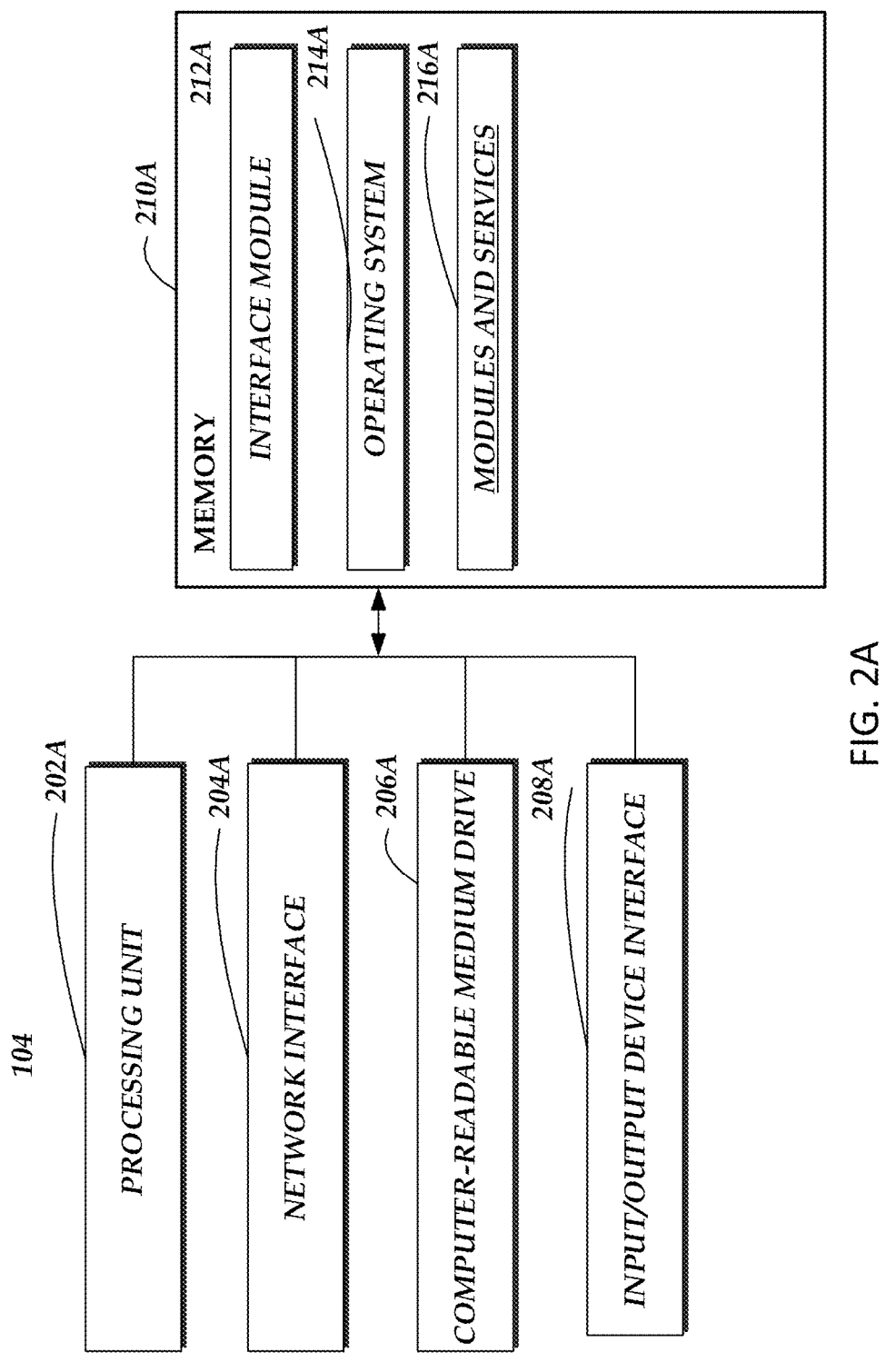
FIG. 2A is a block diagram illustrating example components of a content streaming system.

FIG. 2A is a block diagram illustrating example components of the example content streaming system 104. The example content streaming system 104 includes an arrangement of computer hardware and software components that may be used to implement aspects of the present disclosure. Those skilled in the art will appreciate that the example components may include more (or fewer) components than those depicted in FIG. 2A.

The content streaming system 104 may include one or more processing units 202A (e.g., a general purpose processor or artificial intelligence processor (e.g., comprising one or more arithmetic logic units, data registers, an encryption processor, a video transcoder, input/output busses, and/or a high speed graphics processor)), one or more network interfaces 204A, a non-transitory computer-readable medium drive 206A, and an input/output device interface 208A, all of which may communicate with one another by way of one or more communication buses. The network interface 204A may provide the various services described herein with connectivity to one or more networks or computing systems. The processing unit 202A may thus receive information and instructions from other computing devices, systems, or services via a network. The processing unit 202A may also communicate to and from non-transitory computer-readable medium drive 206A and memory 210A and further provide output information via the input/output device interface 208A. The input/output device interface 208A may also accept input from various input devices, such as a keyboard, mouse, digital pen, touch screen, microphone, camera, etc.

The memory 210A may contain computer program instructions that the processing unit 202A may execute to implement one or more features of the present disclosure. The memory 210A generally includes RAM, ROM and/or other persistent or non-transitory computer-readable storage media. The memory 210A may store an operating system 214A that provides computer program instructions for use by the processing unit 202A in the general administration and operation of the modules and services 216A, including its components. The modules and services 216A are further discussed with respect to FIG. 2B and elsewhere herein. The memory 210A may further include other information for implementing aspects of the present disclosure.

In an example embodiment, the memory 210A includes an interface module 212A. The interface module 212A can be configured to facilitate generating one or more interfaces through which a compatible computing device may send to, or receive from, the modules and services 216A.

The modules or components described above may also include additional modules or may be implemented by computing devices that may not be depicted in FIGS. 2A and 2B. For example, although the interface module 212A and the modules and services 216A are identified in FIG. 2B as single modules, the modules may be implemented by two or more modules and in a distributed manner. By way of further example, the processing unit 202A may optionally include both a general purpose processor and a video codec. The system 104 may offload certain compute-intensive portions of the modules and services 216A (e.g., transcoding video content, redistribution of bit budgets, transrating a stream for adaptive bitrate operations, compositing, and/or the like) to one or more dedicated devices, such as a standalone video codec (e.g., H.264 encoders and decoders), while other code may run on a general purpose processor. The system 104 may optionally be configured to support multiple streaming protocols, may provide low latency pass-through, and may support a large number of parallel streams (e.g., HD, 4K, and/or 8K streams).

The processing unit 202A may optionally comprise a graphics processing unit (GPU) that includes hundreds or thousands of core processors configured to process tasks in parallel. The GPU may include high speed memory dedicated for graphics processing tasks. As another example, the system 104 and its components can be implemented by network servers, application servers, database servers, combinations of the same, or the like, configured to facilitate data transmission to and from data stores, user terminals, and third party systems via one or more networks. Accordingly, the depictions of the modules are illustrative in nature.

Referring to FIG. 2B, the modules and services 216A may include modules that provide a playlist request service 202B, an interstitial selection service 204B, a playlist manifest generation service 208B, a content streaming service 210B, a bit budget redistribution service, 212B, and a clean-up service 214B.

The playlist request service 202B may receive and process requests for playlist manifests, such as manifests discussed elsewhere herein. The interstitial selection service 204B may assemble context information for a given interstitial pod (e.g., the length of the interstitial pod, the subject matter of requested primary content, information regarding a channel the viewer is watching, the content of a scene in which the interstitial pod is located, etc.) and transmit the information to one or more interstitial source and/or decisioning systems. The interstitial source and/or decisioning systems may propose interstitial content to the interstitial selection service 204B of the stitching system. The interstitial selection service 204B may evaluate the proposals and select one or more items of interstitial content for inclusion in the interstitial pod. The content streaming service 210B may be configured to stream video and other content, such as closed captions.

The manifest generation service 208B may be used to assemble a playlist manifest (e.g., M3U8 for HLS, MPD for DASH) including locators (e.g., URLs) pointing to segments and sections of primary and interstitial content and locators (e.g., URLs), organized to correspond to the desired playback sequence. The manifest file may list the available bitrate versions and their corresponding segments. The manifest file informs the player about the structure of the stream and how to access each segment. The manifest may be transmitted to a client (e.g., a browser or dedicated streaming application) on a user device. The client may then request a given item of content (e.g., section or segment) as needed, which may then be served by the corresponding content source or intermediary to the client.

The encoded video segments and manifest files are packaged and prepared for distribution. For example, the content may be encrypted and protected using a DRM (Digital Rights Management) system. The package content may be uploaded to and distributed via a Content Delivery Network (CDN) for efficient delivery to end-users. Advantageously, by having content distributed to CDNs close to respective clients, the delay in streaming content to clients is reduced, and the peak load on the content streaming system 104 is greatly reduced.

During playback, the client-side player may use the manifest file to dynamically switch between different quality levels based on network conditions and device capabilities. This ensures a smooth viewing experience with minimal buffering.

As similarly described elsewhere herein, the bit budget redistribution service 212B may insert new interstitial breakpoints into an item of video content (e.g., a movie, series episode, live event, and/or other types of video content) through an optimized subclipping process. When creating subclips to accommodate an interstitial breakpoint, optionally the bit budget redistribution service 212B identifies and transforms those segments that need to be to transformed, while other segments (and associated playlists) may be left alone, without transforming them, to create subclips of selected portions of the video item. As described elsewhere herein, one or more splice windows may be utilized in determining which segments need to be transformed to accommodate one or more interstitial breakpoints, and corresponding new playlists may be created.

The clean up service 214B is configured to clean up unneeded fragments and other data as described elsewhere herein.

Certain example aspects of the interstitial breakpoint insertion process and clean-up process will now be described in further detail.

Figure 3:
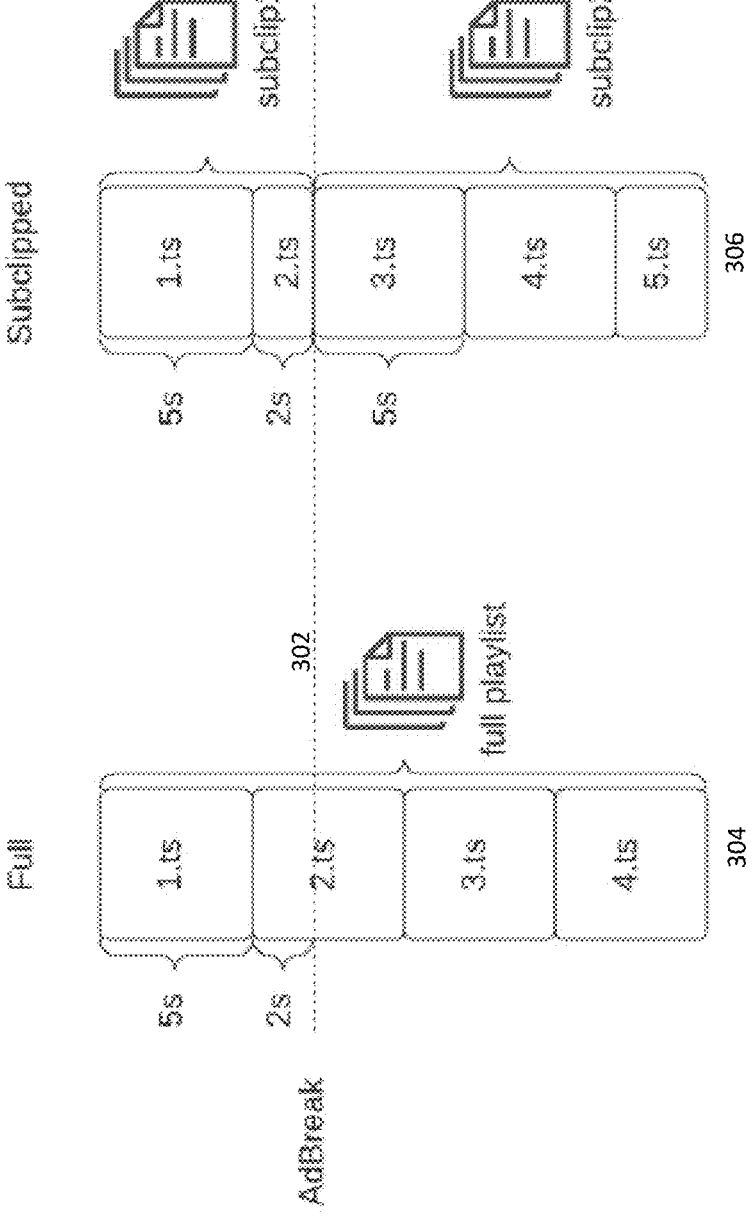
FIG. 3 illustrates an example conventional technique for breakpoint insertion.

In the illustrative example of the conventional solution depicted in FIG. 3, an interstitial breakpoint is to be inserted within a video item 304 at location 302 (7 seconds after the beginning of the video item). In the original, full playlist, the location 302 falls within segment 2.ts. Therefore, conventionally, a subclipping process is performed over all of the segments to create a new subclipped video 306 with respective subclip playlists and to resize segment lengths to create a breakpoint between segments 2.ts and 3.ts, where segment 1.ts is 5 seconds long, and 2.ts is 2 seconds long, so that the breakpoint between 2.ts and 3.ts is at the desired 7 second point.

Disadvantageously, this conventional process may need to be repeated to create a new set of subclips each time any of the interstitial insertion breakpoints changes. Because the entire movie is re-transcoded for each subclipping process, inordinate amounts of computer processing power, memory, and time are utilized. In addition, the new set of media segments will not be immediately cached on a content distribution network (CDN), making access by client devices slower.

The challenges and computer resource utilization are even greater when multi-regional support is needed, wherein there may be different interstitial insertion rules for different regions. Thus, for example, multiple transcodings of a given movie may need to be performed for each movie for each region, utilizing even more computer resources, memory, network bandwidth, and requiring even more time.

Further, a poorly placed interstitial insertion breakpoint may create spikes in the bitrate and thus degrade the playout experience.

Thus, it would be advantageous to optimize the subclipping process, without unduly increasing the utilization of computer processing, memory, and network resources, and without taking an inordinate amount of time.

Methods and systems are described herein configured to provide an improved technique for the insertion of interstitial (e.g., advertisement) breakpoints that is more efficient (in terms of processor, memory, network utilization) than conventional techniques and which is quicker than conventional techniques.

By way of background, bit budgets play an important part in video compression, and in managing the quality and efficiency of streaming video. Bit budgets determine how many bits are allocated to different types of video frames (IDR, P, and B frames) within a video stream. Following is a description on the application of bit budgets to different frame types (IDR, P, and B frames).

IDR (Instantaneous Decoder Refresh Frames) frames are a type of I-frame (intra-coded frame) that mark a point in the video stream where decoding can start cleanly without reference to previous (or future) frames. IDR frames may be used for resynchronization, seeking, and error recovery. IDR frames typically need a higher bit budget compared to P and B frames because they are encoded independently of other frames. The quality and detail of the video depend on the IDR frame, and so a significant portion of the bit budget is allocated to these frames to ensure high quality.

P frames are encoded using data from previous I or P frames. P frames carry only the differences (motion vectors and residuals) from the preceding frames, making P frames more efficient in terms of bit usage compared to IDR frames.

P frames generally require fewer bits than IDR frames but more than B frames. The bit budget for P frames is adjusted to maintain the balance between compression efficiency and video quality. Because P frames are predictive, their bit budget needs to be sufficient to avoid error propagation.

B frames are encoded using both previous and future frames for prediction. This enables B frames to achieve the highest compression ratio because they often carry less new information. Therefore, B frames typically have the smallest bit budget of the three frame types. Because B frames rely on both preceding and succeeding frames, they are highly efficient but can suffer the most if the bit budget is too low, leading to artifacts in complex motion or texture areas.

Figure 4A:
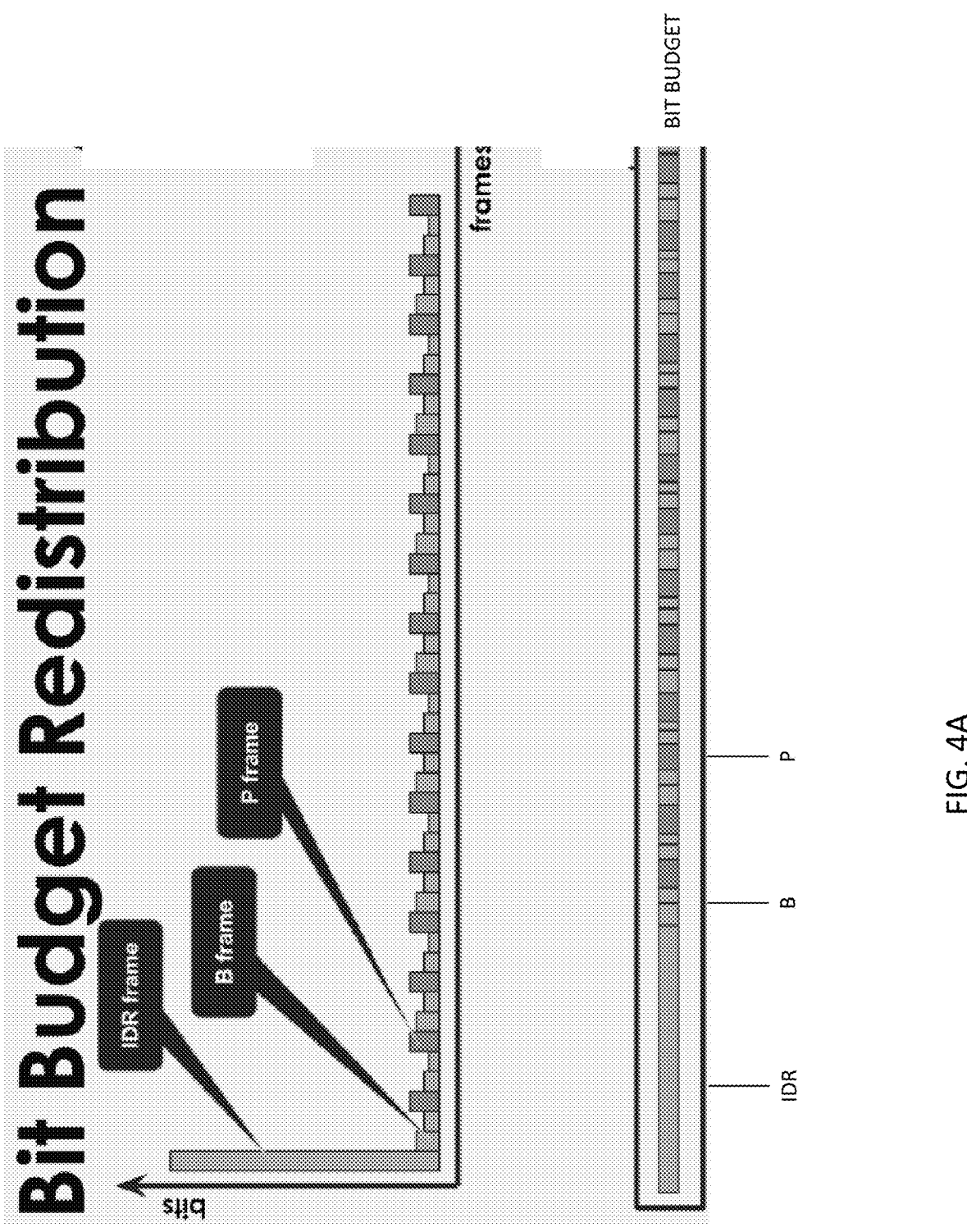
FIG. 4A illustrates an example of a bit budget distribution for breakpoint insertion.

FIG. 4A illustrates an example of a bit budget distribution over frames, wherein the frames include IDR, B, and P frames.

When creating subclips to accommodate an interstitial (e.g., advertisement) breakpoint, optionally only those segments that need to be to transformed are identified and transformed, while other segments may be left alone, without transforming them, so as to create subclips of selected portions of the video item. However, during this process of generating subclips, in certain situations it may not be possible to introduce another IDR frame, as the bit budget may not be sufficient to accommodate another IDR frame.

Figure 4B:
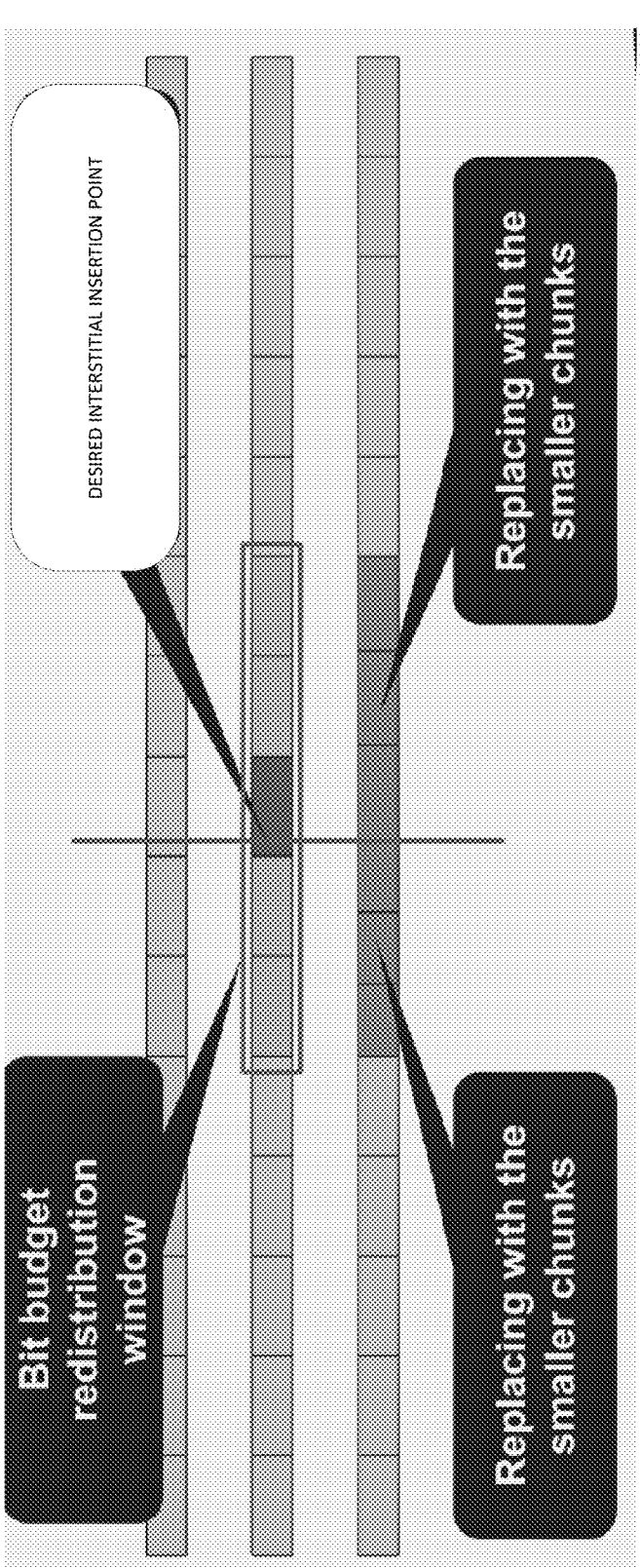
FIGS. 4B and 4C illustrate example applications of a bit budget redistribution window.

With reference to FIG. 4B, in order to account for the foregoing limitations in redistributing bit budget and the potential inability to add IDR frames, while including the needed amount of ts segments in the window of a new splicing point (corresponding to the desired location of the interstitial insertion breakpoint) on the video for the insertion of an interstitial breakpoint, the following technique may be utilized.

A window (which may be referred to as a splice or bit redistribution window) may be sized and placed about the desired location of the interstitial insertion breakpoint. For example, the window may be sized to encompass the ts segment in which the desired insertion point lies and one or more segments (e.g., 2 segments) on either side of the desired insertion point. The segments within the window may be replaced with smaller chunks (subclips) to thereby provide a location for an interstitial insertion breakpoint.

Figure 4C:
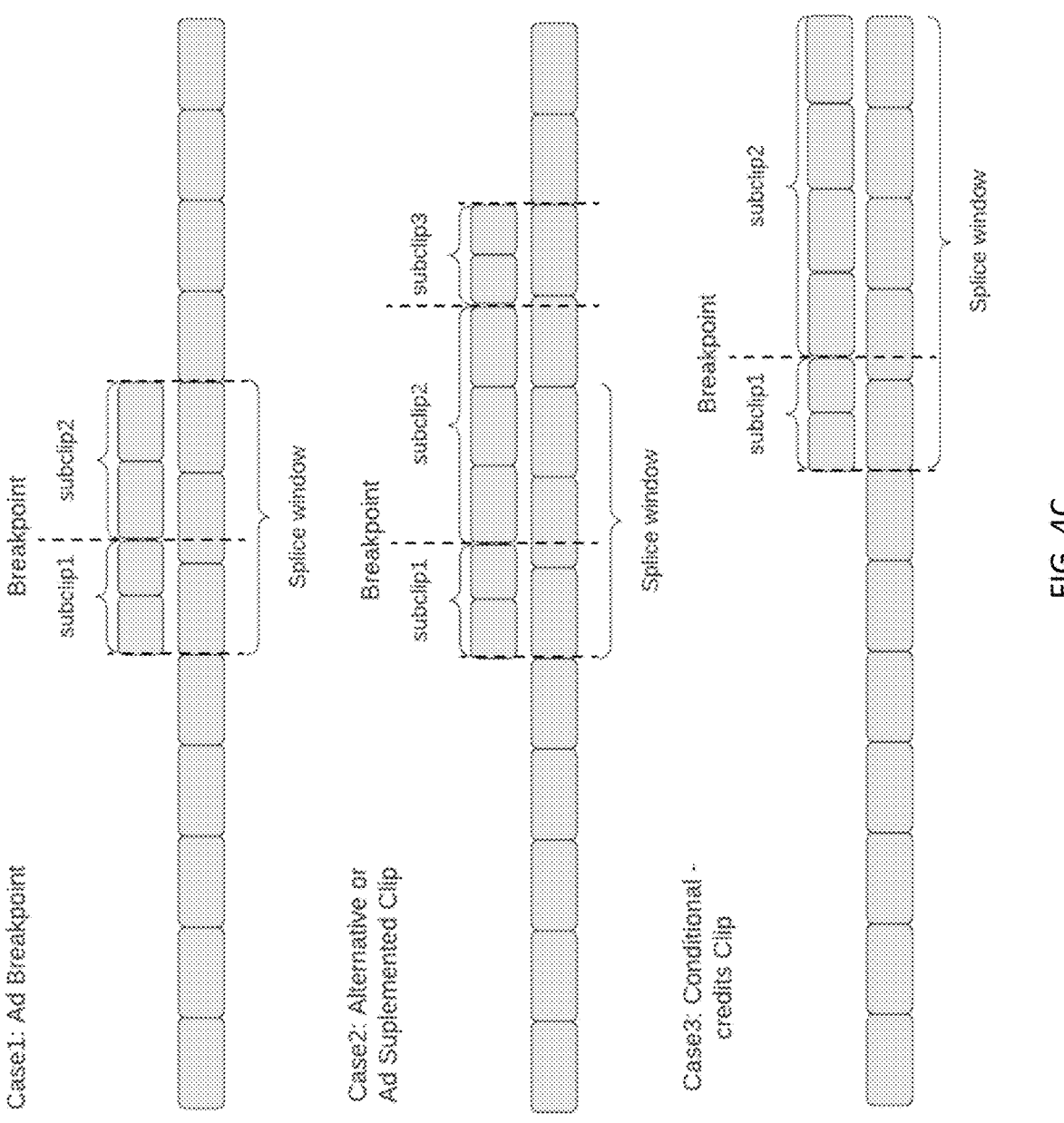

FIG. 4C illustrates three example scenarios, Case 1 where an interstitial (e.g., an ad) breakpoint is inserted, Case 2 wherein an alternative or ad supplemented breakpoint is inserted, and Case 3, wherein a conditional credits clip breakpoint is inserted.

With respect to Case 2, the subclips may correspond to overlays for a portion of a main clip (e.g., a movie or program). Such overlays may correspond to advertisements that overlay the main clip. In this example, subclip 2 may correspond to a first overlay, and subclip 3 may correspond to a second overlay. The selection of overlays may be customized for a given viewer (e.g., based on user demographics, viewing history, interactions with advertisements, and/or the like).

With respect to Case 3, the subclips may correspond credits (e.g., identifying producers, directors, writers, actors, composers, costume designers, editors, etc.) for a clip (e.g., a program or movie) that provides a different language version of the credits. Different versions of the credits may be provided to different viewers (e.g., based on the language preferences specified by the users, based on the country/location of the viewer, and/or the like).

Optionally, rather than creating the new playlists with old segments, the full playlist of the movie along with the new subclips are provided, so that the stitching service will stitch them together.

The following data structure may be utilized to enable the foregoing use cases:

```
Clip.subclips: [{
subclips: [ObjectId],
    inPointMS: IntNumber,
    outPointMS: IntNumber,
    breakpointsMS: [IntNumber],
} ]
``` inPointMS corresponds to the start of the splice window in milliseconds relative to the start of the entire clip (e.g., the start of a movie or program).

outPointMS corresponds to the end of the splice window in milliseconds relative to the start of the entire clip (e.g., the start of a movie or program).

breakpointsMS corresponds to the location of breakpoint (s) in milliseconds relative to the start of the entire clip (e.g., the start of a movie or program). For example, In Case 1 and Case 3, there is one breakpoint, while in Case 2 there are two breakpoints.

The forgoing data structure enables no repetition of the objects as in the fragments array and enables more flexible retrieval of subclips for the needed breakpoints and enables the flexible cleanup of unused subclips.

Figure 4D:
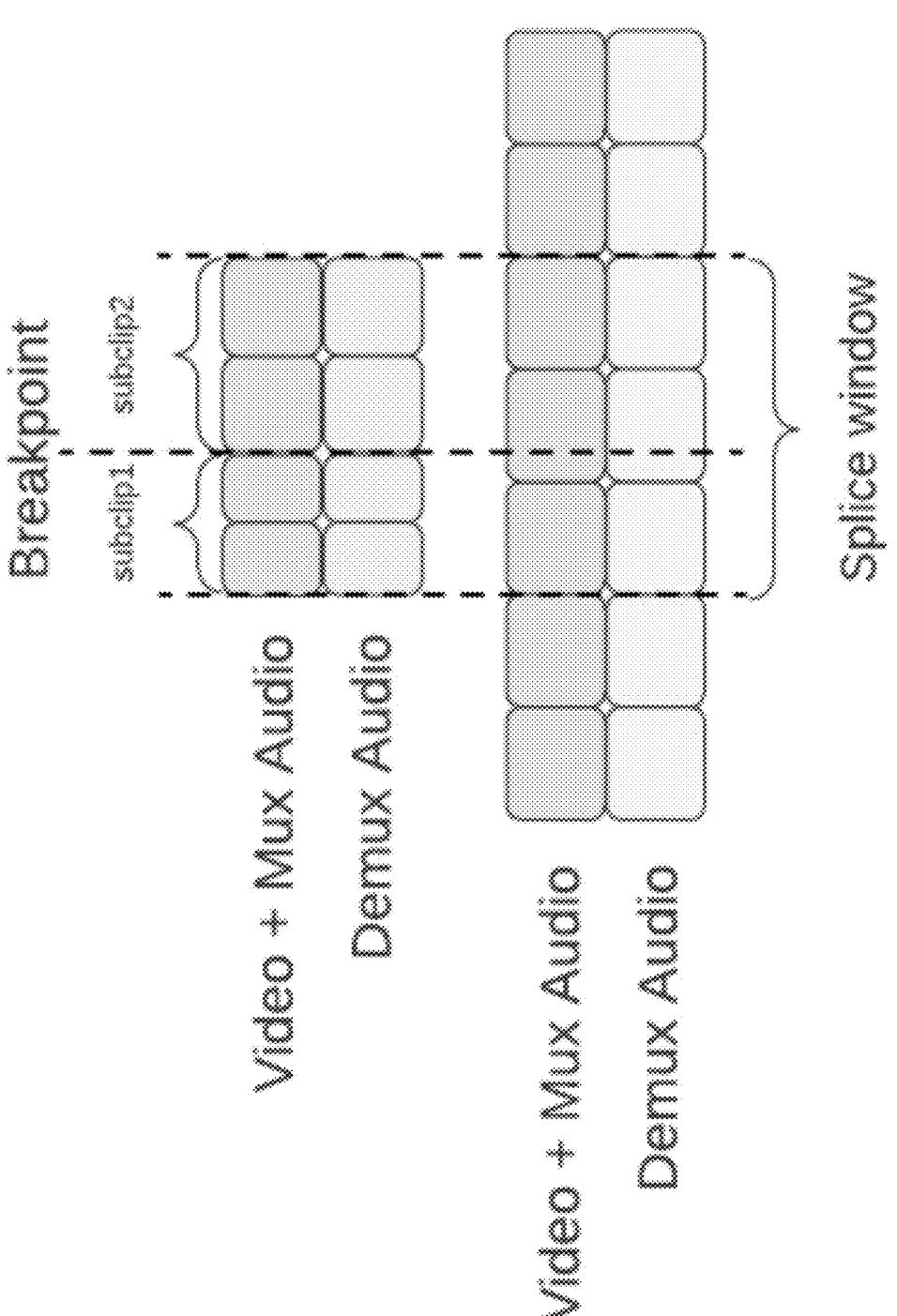
FIG. 4D illustrates an example of demuxed audio segments.

FIG. 4D illustrates an example of demuxed audio segments case wherein the video and audio streams are aligned when creating subclips for the insertion of a breakpoint.

It is estimated that, for a 90 minute video program, the disclosed approach (which restricts the re-processing to the splice window) is about 18 times faster and utilizes about 20 times less storage as compared to processing the entire video program to create subclips to provide a breakpoint insertion point.

The following example structure of data in the clip object for subclips may optionally be utilized:

```
Clip.fragments: [{
breakpoints: [ ],//array of breakpoint times in integer
subclips: [ ],//array of ObjectIDs references to the subclips
to
    align with the breakpoints
} ]
```

Using the data structure above, the disclosed subclipping process may be able to reuse existing subclip playlists that do not need processing and may also reuse subclips collection entities in the new item in clip.fragments array comprising a reference identifier (e.g., a unique OBJECTID) to the existing subclip.

For the example illustrated in FIG. 4C, in a subclip collection there are 4 Subclip objects created, and they may be referenced in the clip.fragments.subclips array by ObjectIDs:

subclip1, subclip4—will have playlists generated based on the original transcode output while referencing the existing media segments and, when applicable, encryption keys;

subclip2, subclip3—will be the output of the new transcode process based on the ts segments in the splice window from the original transcode output, with corresponding playlists.

Advantageously, the new subclips with be comparable in length with conventionally generated subclips and so will fit in a stitched video stream over a discontinuity tag (which informs the client of a change that is coming to the streaming media so the client can prepare for the change ahead of time) as ads are being slotted in. Optionally, the length of the subclips may be set to be no shorter than a threshold period of time (e.g., 4, 5, 6, 7, 8 seconds) to better ensure compatibility with a large number of clients (e.g., video streaming devices, set top boxes, and/or the like).

FIG. 5 illustrates an example process of transforming a selected portion of a video file to create an interstitial breakpoint.

At block 502, a set of desired interstitial breakpoints is received (e.g., as a list, such as an ad list, from a user via a user interface or via a remote system) that identifies corresponding times that the interstitial breakpoints are to be inserted into a first transcoded item of video content (e.g., relative to the beginning of the item of video content). At block 504, a determination may be made as to whether there are existing spice subclips available for use so that a duplicative generation of subclips is not performed for the same interstitial breakpoints.

At block 506, a determination is made as to which new interstitial breakpoints in the breakpoint list are missing existing subclips that may be reused.

At block 508, splicing windows are determined for the new interstitial breakpoint list items. For example, the location and/or size of the respective interstitial breakpoints may be determined. The size may be specified as the number of segments on either size of the desired interstitial breakpoint location plus the segment where the desired interstitial breakpoint location currently falls. The process ensures that breakpoint locations that are close to each other do not have overlapping splicing windows. Splicing windows may optionally be reduced in size if the breakpoint locations are too close together (e.g., within a threshold period of time from each other). Optionally, the window is sized to encompass as few existing segments as possible to create a breakpoint at the desired frame/time.

At block 510, new subclips are generated for the new interstitial breakpoint items for which existing subclips are not available. Such subclips may be transcoded. Different profiles may be generated to ensure identical subclips are generated across some or all the profiles in the ABR ladder.

At block 512, the new playlists and the previously existing playlists are stitched together to transmit to the client on the user device, wherein the client is configured to request content in accordance with the new playlists and the existing playlists.

At block 514, the newly transcoded content and the previously transcoded content may be streamed to the client in response to requests from the client in accordance with the new and existing playlists.

The above process may be utilized with a variety of protocols (e.g., DASH, HLS, and/or the like). As discussed elsewhere herein, the foregoing process will reduce the amount of storage and transcoding processing power utilization for both a first run for subclipping and with new iteration subclipping runs (e.g., as needed when a new wherever curator of content introduces a new interstitial breakpoint (e.g., an ad breakpoint), or moves an existing interstitial breakpoint). This reduction in processor and memory utilization is accomplished by limiting the process of creating subclips to only the new interstitial breakpoint and reusing the previously created subclips that fit the new iteration of subclipping.

The clip.fragments.breakpoints may be utilized to identify if the subclip set fits a corresponding adPod in episode.sources.adPods (where episode.sources.adPod defines where in a given episode the ad pods are inserted and may comprise the start time, duration, and/or sequence of ads within each pod).

A serverless storage service (e.g., S3) may be utilized in the streaming and interstitial insertion process that enables code to be run in response to events without provisioning or managing servers. The computing service may utilize the latest fitting subclip set in order to be able to safely clean up (and optionally delete) the old, no-longer utilized subclips from a corresponding storage mechanism (e.g., a database, cloud storage, and/or the like).

Figure 6:
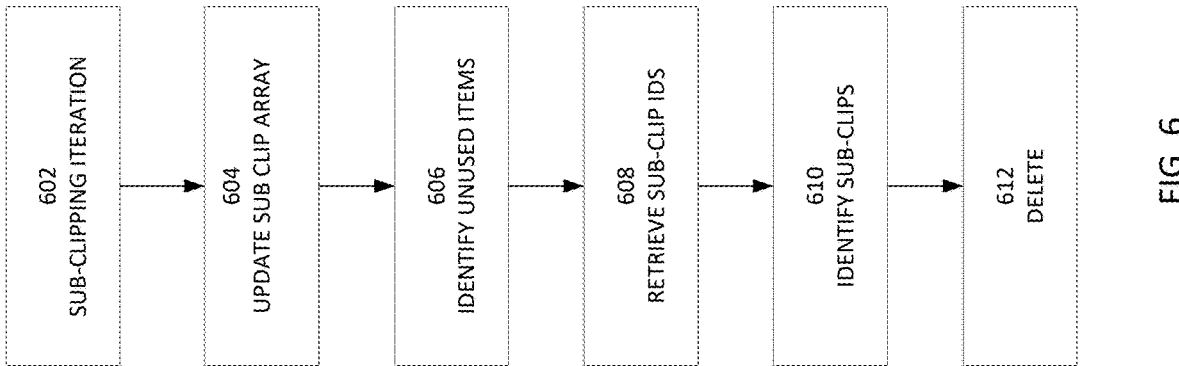
FIG. 6 illustrates an example clean-up process.

An example automatic cleanup process for unused, unneeded, database and media files (e.g., fragments) will now be described with reference to FIG. 6. At block 602, a new subclipping iteration is triggered (e.g., in response to the insertion of a new interstitial breakpoint or the movement of an existing interstitial breakpoint), such as described with respect to FIG. 5. At block 604, the sub clip array is updated with the new object containing a set of subclips which is aligned with the episode breakpoints. Optionally, the clip.fragments array is only updated after all the segments in all the profiles for the new subclips have been successfully created and stored.

At block 606, unused items (e.g., fragments) may be identified by retrieving episodes where the subclip is being used and determining which items in the clip.fragments array do not match any of the episode's breakpoints sets.

In addition, the process may identify which of the subclips from the sublips collection are to be removed from the database and may remove the media items (playlists and video segments) stored in a container, such as an S3 bucket.

The deletion process may be performed as described below.

At block 608, unique subclipIDs from the clip.fragments.subclips of clip.fragments may be retrieved. Unique subclipIDs from the clip.fragments.subclips of clip.fragments which are not marked for deletion and have episodes with respective aligned breakpoints may also be retrieved. At block 610, SubclipIDs are identified for deletion from the clip.fragments.subclips of clip.fragments that are not also present in the subclipIDs from the clip.fragments.subclips of clip.fragments which are not marked for deletion. At block 612, the subclips identified for deletion are deleted along with respective playlists and video segments.

An aspect of the present disclosure relates to a system configured to provide distribution of video content over a network, the system comprising: a computer device; non-transitory computer readable memory having program instructions stored thereon that when executed by the computer device cause the system to perform operations comprising: receive a set of interstitial breakpoints for a first transcoded item of video content comprising a plurality of segments; apply a splicing window of a first size for a first interstitial breakpoint to a first portion of a first item of video content, wherein the first portion of the first item of video content has been previously transcoded, and the splicing window is larger than a segment of the first transcoded item of video content in size generate new subclips for the first portion of the of the first item of video content, the new subclips comprising a first subclip and a second subclip; re-transcode the first portion of the of the first item of video content comprising the new subclips within the splicing window, wherein a boundary between the first subclip and the second subclip define a location for the first interstitial breakpoint; identify existing segments of the first transcoded item of video content that can be used with the set of interstitial breakpoints without re-transcoding, wherein the existing segments of the first transcoded item of video content that can with the set of interstitial breakpoints are associated with corresponding existing playlists; generate new playlists for the new subclips; transmit the new playlists for the new subclips and the existing playlists to a client, wherein the client is configured to request content in accordance with the new playlists and the existing playlists; and stream the existing segments and the new subclips to the client in accordance with requests from the client.

Optionally, the operations further comprising determining the size of the splicing window based at least in part on a location of the first interstitial breakpoint, locations of adjacent interstitial breakpoint, and a bit budget redistribution. Optionally, new playlists generated for the new subclips comprise references to an existing segment. Optionally, the operations further comprise updating a fragment array with new subclip objects. Optionally, the operations further comprise: identifying unused items in memory for deletion by determining which items in a clip fragments array do not match any interstitial breakpoints sets for a first episode; and deleting the identified unused items from memory. Optionally, the operations further comprise: reusing subclips collection entities in a clip fragments array comprising a reference identifier to an existing subclip. Optionally, the new playlists comprise new DASH or HLS playlists.

An aspect of the present disclosure relates to a computer-implemented method, the method comprising: accessing a set of interstitial breakpoints for a first transcoded item of video content comprising a plurality of segments; applying a window of a first size for a first interstitial breakpoint to a first portion of a first item of video content, wherein the first portion of the first item of video content has been previously transcoded, and the window is larger than a segment of the first transcoded item of video content in size; generating new subclips for the first portion of the of the first item of video content, the new subclips comprising a first subclip and a second subclip; re-transcoding the first portion of the of the first item of video content comprising the new subclips within the window, wherein a boundary between the first subclip and the second subclip define a location for the first interstitial breakpoint; identifying existing segments of the first transcoded item of video content that can be used with the set of interstitial breakpoints without re-transcoding, wherein the existing segments of the first transcoded item of video content that can with the set of interstitial breakpoints are associated with corresponding existing playlists; generating new playlists for the new subclips; transmitting the new playlists for the new subclips and the existing playlists to a client, wherein the client is configured to request content in accordance with the new playlists and the existing playlists; and streaming the existing segments and the new subclips to the client in accordance with requests from the client. Optionally, the method further comprises determining the size of the window based at least in part on a location of the first interstitial breakpoint, locations of adjacent interstitial breakpoint, and a bit budget redistribution. Optionally new playlists generated for the new subclips comprise references to an existing segment. Optionally, the method further comprises updating a fragment array with new subclip objects. Optionally, the method further comprises: identifying unused items in memory for deletion by determining which items in a clip fragments array do not match any interstitial breakpoints sets for a first episode; and deleting the identified unused items from memory. Optionally, the method further comprises: reusing subclips collection entities in a clip fragments array comprising a reference identifier to an existing subclip. Optionally, the new playlists comprise new DASH or HLS playlists.

An aspect of the present disclosure relates to a non-transitory computer readable memory having program instructions stored thereon that when executed by at least one computing device cause the at least one computing device to perform operations comprising: receive a set of breakpoints for a first transcoded item of video content comprising a plurality of segments; apply a window of a first size for a first breakpoint to a first portion of a first item of video content, wherein the first portion of the first item of video content has been previously transcoded, and the window is larger than a segment of the first transcoded item of video content in size generate new subclips for the first portion of the of the first item of video content, the new subclips comprising a first subclip and a second subclip; re-transcode the first portion of the of the first item of video content comprising the new subclips within the window, wherein a boundary between the first subclip and the second subclip define a location for the first breakpoint; identify existing segments of the first transcoded item of video content that can be used with the set of breakpoints without re-transcoding, wherein the existing segments of the first transcoded item of video content that can with the set of breakpoints are associated with corresponding existing playlists; generate new playlists for the new subclips; transmit the new playlists for the new subclips and the existing playlists to a client, wherein the client is configured to request content in accordance with the new playlists and the existing playlists; and stream the existing segments and the new subclips to the client in accordance with requests from the client.

Optionally, the operations further comprise determining the size of the window based at least in part on a location of the first interstitial breakpoint, locations of adjacent interstitial breakpoint, and a bit budget redistribution. Optionally, new playlists generated for the new subclips comprise references to an existing segment. Optionally, the operations further comprise updating a fragment array with new subclip objects. Optionally, the operations further comprise: identifying unused items in memory for deletion by determining which items in a clip fragments array do not match any breakpoints sets for a first episode; and deleting the identified unused items from memory. Optionally, the operations further comprise: reusing subclips collection entities in a clip fragments array comprising a reference identifier to an existing subclip. Optionally the new playlists comprise new DASH or HLS playlists.

An aspect of the present disclosure relates to a system configured to provide distribution of video content over a network, the system comprising: a computer device; non-transitory computer readable memory having program instructions stored thereon that when executed by the computer device cause the system to perform operations comprising: receive a set of interstitial breakpoints for a first transcoded item of video content comprising a plurality of segments; apply a splicing window of a first size for a first interstitial breakpoint to a first portion of a first item of video content, wherein the first portion of the first item of video content has been previously transcoded, and the splicing window is larger than a segment of the first transcoded item of video content in size generate new subclips for the first portion of the of the first item of video content, the new subclips comprising a first subclip and a second subclip; re-transcode the first portion of the of the first item of video content comprising the new subclips within the splicing window, wherein a boundary between the first subclip and the second subclip define a location for the first interstitial breakpoint; identify existing segments of the first transcoded item of video content that can be used with the set of interstitial breakpoints without re-transcoding, wherein the existing segments of the first transcoded item of video content that can with the set of interstitial breakpoints are associated with corresponding existing playlists; generate new playlists for the new subclips; transmit the new playlists for the new subclips and the existing playlists to a client, wherein the client is configured to request content in accordance with the new playlists and the existing playlists; and stream the existing segments and the new subclips to the client in accordance with requests from the client.

Optionally, the operations further comprise determining the size of the splicing window based at least in part on a location of the first interstitial breakpoint, locations of adjacent interstitial breakpoint, and a bit budget redistribution.

Optionally, wherein new playlists generated for the new subclips comprise references to an existing segment.

Optionally, the operations further comprise updating a fragment array with new subclip objects.

Optionally, the operations further comprise: identifying unused items in memory for deletion by determining which items in a clip fragments array do not match any interstitial breakpoints sets for a first episode; and deleting the identified unused items from memory.

Optionally, the operations further comprises: reusing subclips collection entities in a clip fragments array comprising a reference identifier to an existing subclip.

Optionally, wherein the new playlists comprise new DASH or HLS playlists.

An aspect of the present disclosure relates to a computer-implemented method, the method comprising: accessing a set of interstitial breakpoints for a first transcoded item of video content comprising a plurality of segments; applying a window of a first size for a first interstitial breakpoint to a first portion of a first item of video content, wherein the first portion of the first item of video content has been previously transcoded, and the window is larger than a segment of the first transcoded item of video content in size; generating new subclips for the first portion of the of the first item of video content, the new subclips comprising a first subclip and a second subclip; re-transcoding the first portion of the of the first item of video content comprising the new subclips within the window, wherein a boundary between the first subclip and the second subclip define a location for the first interstitial breakpoint; identifying existing segments of the first transcoded item of video content that can be used with the set of interstitial breakpoints without re-transcoding, wherein the existing segments of the first transcoded item of video content that can with the set of interstitial breakpoints are associated with corresponding existing playlists; generating new playlists for the new subclips; transmitting the new playlists for the new subclips and the existing playlists to a client, wherein the client is configured to request content in accordance with the new playlists and the existing playlists; and streaming the existing segments and the new subclips to the client in accordance with requests from the client.

Optionally, the method further comprises determining the size of the window based at least in part on a location of the first interstitial breakpoint, locations of adjacent interstitial breakpoint, and a bit budget redistribution.

Optionally, new playlists generated for the new subclips comprise references to an existing segment.

Optionally, the method further comprises updating a fragment array with new subclip objects.

Optionally,, the method further comprises: identifying unused items in memory for deletion by determining which items in a clip fragments array do not match any interstitial breakpoints sets for a first episode; and deleting the identified unused items from memory.

Optionally, the method further comprises: reusing subclips collection entities in a clip fragments array comprising a reference identifier to an existing subclip.

Optionally, the new playlists comprise new DASH or HLS playlists.

An aspect of the present disclosure relates to a non-transitory computer readable memory having program instructions stored thereon that when executed by at least one computing device cause the at least one computing device to perform operations comprising: receive a set of breakpoints for a first transcoded item of video content comprising a plurality of segments; apply a window of a first size for a first breakpoint to a first portion of a first item of video content, wherein the first portion of the first item of video content has been previously transcoded, and the window is larger than a segment of the first transcoded item of video content in size generate new subclips for the first portion of the of the first item of video content, the new subclips comprising a first subclip and a second subclip; re-transcode the first portion of the of the first item of video content comprising the new subclips within the window, wherein a boundary between the first subclip and the second subclip define a location for the first breakpoint; identify existing segments of the first transcoded item of video content that can be used with the set of breakpoints without re-transcoding, wherein the existing segments of the first transcoded item of video content that can with the set of breakpoints are associated with corresponding existing playlists; generate new playlists for the new subclips; transmit the new playlists for the new subclips and the existing playlists to a client, wherein the client is configured to request content in accordance with the new playlists and the existing playlists; and stream the existing segments and the new subclips to the client in accordance with requests from the client.

Optionally, the operations further comprise determining the size of the window based at least in part on a location of the first interstitial breakpoint, locations of adjacent interstitial breakpoint, and a bit budget redistribution.

Optionally, new playlists generated for the new subclips comprise references to an existing segment.

Optionally, the operations further comprise updating a fragment array with new subclip objects.

Optionally, the operations further comprise: identifying unused items in memory for deletion by determining which items in a clip fragments array do not match any breakpoints sets for a first episode; and deleting the identified unused items from memory.

Optionally, the operations further comprise: reusing subclips collection entities in a clip fragments array comprising a reference identifier to an existing subclip.

Optionally, the new playlists comprise new DASH or HLS playlists.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop-down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc. While the above detailed description has shown, described, and pointed out novel features as applied to various embodiments, it can be understood that various omissions, substitutions, and changes in the form and details of the systems, devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description.

All changes which come within the meaning and range of equivalency of the claims are to be embraced within their scope.

What is claimed is:
1. A system configured to provide distribution of video content over a network, the system comprising:
    a computer device;

non-transitory computer readable memory having program instructions stored thereon that when executed by the computer device cause the system to perform operations comprising:

receive a set of interstitial breakpoints for a first transcoded item of video content comprising a plurality of segments;

apply a splicing window of a first size for a first interstitial breakpoint to a first portion of a first item of video content, wherein the first portion of the first item of video content has been previously transcoded, and the splicing window is larger than a segment of the first transcoded item of video content in size generate new subclips for the first portion of the of the first item of video content, the new subclips comprising a first subclip and a second subclip;

re-transcode the first portion of the of the first item of video content comprising the new subclips within the splicing window, wherein a boundary between the first subclip and the second subclip define a location for the first interstitial breakpoint;

identify existing segments of the first transcoded item of video content that can be used with the set of interstitial breakpoints without re-transcoding, wherein the existing segments of the first transcoded item of video content that can with the set of interstitial breakpoints are associated with corresponding existing playlists;

generate new playlists for the new subclips;

transmit the new playlists for the new subclips and the existing playlists to a client, wherein the client is configured to request content in accordance with the new playlists and the existing playlists; and stream the existing segments and the new subclips to the client in accordance with requests from the client.

2. The system as defined in claim 1, the operations further comprising determining the size of the splicing window based at least in part on a location of the first interstitial breakpoint, locations of adjacent interstitial breakpoint, and a bit budget redistribution.

3. The system as defined in claim 1, wherein new playlists generated for the new subclips comprise references to an existing segment.

4. The system as defined in claim 1, the operations further comprising updating a fragment array with new subclip objects.

5. The system as defined in claim 1, the operations further comprising:

identifying unused items in memory for deletion by determining which items in a clip fragments array do not match any interstitial breakpoints sets for a first episode; and deleting the identified unused items from memory.

6. The system as defined in claim 1, the operations further comprising:

reusing subclips collection entities in a clip fragments array comprising a reference identifier to an existing subclip.

7. The system as defined in claim 1, wherein the new playlists comprise new DASH or HLS playlists.

8. A computer-implemented method, the method comprising:

accessing a set of interstitial breakpoints for a first transcoded item of video content comprising a plurality of segments;

applying a window of a first size for a first interstitial breakpoint to a first portion of a first item of video content, wherein the first portion of the first item of video content has been previously transcoded, and the window is larger than a segment of the first transcoded item of video content in size;

generating new subclips for the first portion of the of the first item of video content, the new subclips comprising a first subclip and a second subclip;

re-transcoding the first portion of the of the first item of video content comprising the new subclips within the window, wherein a boundary between the first subclip and the second subclip define a location for the first interstitial breakpoint;

identifying existing segments of the first transcoded item of video content that can be used with the set of interstitial breakpoints without re-transcoding, wherein the existing segments of the first transcoded item of video content that can with the set of interstitial breakpoints are associated with corresponding existing playlists;

generating new playlists for the new subclips;

transmitting the new playlists for the new subclips and the existing playlists to a client, wherein the client is configured to request content in accordance with the new playlists and the existing playlists; and streaming the existing segments and the new subclips to the client in accordance with requests from the client.

9. The computer-implemented method as defined in claim 8, the method further comprising determining the size of the window based at least in part on a location of the first interstitial breakpoint, locations of adjacent interstitial breakpoint, and a bit budget redistribution.

10. The computer-implemented method as defined in claim 8, wherein new playlists generated for the new subclips comprise references to an existing segment.

11. The computer-implemented method as defined in claim 8, the method further comprising updating a fragment array with new subclip objects.

12. The computer-implemented method as defined in claim 8, the method further comprising:

identifying unused items in memory for deletion by determining which items in a clip fragments array do not match any interstitial breakpoints sets for a first episode; and deleting the identified unused items from memory.

13. The computer-implemented method as defined in claim 8, the method further comprising:

reusing subclips collection entities in a clip fragments array comprising a reference identifier to an existing subclip.

14. The computer-implemented method as defined in claim 8, wherein the new playlists comprise new DASH or HLS playlists.

15. Non-transitory computer readable memory having program instructions stored thereon that when executed by at least one computing device cause the at least one computing device to perform operations comprising:

receive a set of breakpoints for a first transcoded item of video content comprising a plurality of segments;

apply a window of a first size for a first breakpoint to a first portion of a first item of video content, wherein the first portion of the first item of video content has been previously transcoded, and the window is larger than a segment of the first transcoded item of video content in size generate new subclips for the first portion of the of the first item of video content, the new subclips comprising a first subclip and a second subclip;

re-transcode the first portion of the of the first item of video content comprising the new subclips within the window, wherein a boundary between the first subclip and the second subclip define a location for the first breakpoint;

identify existing segments of the first transcoded item of video content that can be used with the set of breakpoints without re-transcoding, wherein the existing segments of the first transcoded item of video content that can with the set of breakpoints are associated with corresponding existing playlists;

generate new playlists for the new subclips;

transmit the new playlists for the new subclips and the existing playlists to a client, wherein the client is configured to request content in accordance with the new playlists and the existing playlists; and stream the existing segments and the new subclips to the client in accordance with requests from the client.

16. The non-transitory computer readable memory as defined in claim 15, the operations further comprising determining the size of the window based at least in part on a location of the first interstitial breakpoint, locations of adjacent interstitial breakpoint, and a bit budget redistribution.

17. The non-transitory computer readable memory as defined in claim 15, wherein new playlists generated for the new subclips comprise references to an existing segment.

18. The non-transitory computer readable memory as defined in claim 15, the operations further comprising updating a fragment array with new subclip objects.

19. The non-transitory computer readable memory as defined in claim 15, the operations further comprising:

identifying unused items in memory for deletion by determining which items in a clip fragments array do not match any breakpoints sets for a first episode; and deleting the identified unused items from memory.

20. The non-transitory computer readable memory as defined in claim 15, the operations further comprising:

reusing subclips collection entities in a clip fragments array comprising a reference identifier to an existing subclip.

21. The non-transitory computer readable memory as defined in claim 15, wherein the new playlists comprise new DASH or HLS playlists.

* * * * *